United States Patent [19]

Augustin, Jr. et al.

[11] 3,852,780
[45] Dec. 3, 1974

[54] FILM PACK ADAPTER

[75] Inventors: Rolf M. Augustin, Jr., Wellesely Hills; Donald E. Moodie, Marblehead, both of Mass.

[73] Assignee: Polaroid Corporation, Cambridge, Mass.

[22] Filed: Mar. 5, 1973

[21] Appl. No.: 338,098

[52] U.S. Cl. .................................. 354/86, 354/275
[51] Int. Cl. ........................................ G03b 17/50
[58] Field of Search .............. 95/13, 19, 20, 22, 23, 95/67

[56] References Cited
UNITED STATES PATENTS

| 776,291 | 11/1904 | Brownell | 95/67 |
| 1,266,323 | 5/1918 | Ruttan et al. | 95/22 |
| 2,326,075 | 8/1943 | Smith et al. | 95/67 X |
| 2,353,895 | 7/1944 | Steiner | 95/19 X |
| 3,359,877 | 12/1967 | Kitrosser | 95/19 X |

FOREIGN PATENTS OR APPLICATIONS

| 375,834 | 5/1923 | Germany | 95/19 |

Primary Examiner—Fred L. Braun
Attorney, Agent, or Firm—John W. Erickson

[57] ABSTRACT

A holder for film packs containing film units of the self-processing type. The holder contains processing rollers, and is formed with a framing aperture on a side adapted to be secured to an adapter plate. The side containing the framing aperture is faced off to provide a plane surface locating the uppermost film unit in a cassette, and is formed with a peripheral groove to accept a light seal for a dark slide. The holder is readily adapted for use with a variety of cameras without remodeling the camera back.

9 Claims, 6 Drawing Figures

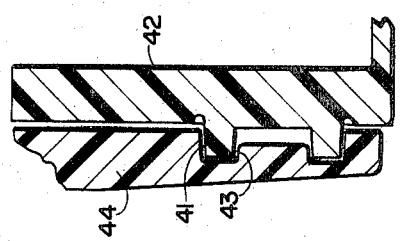
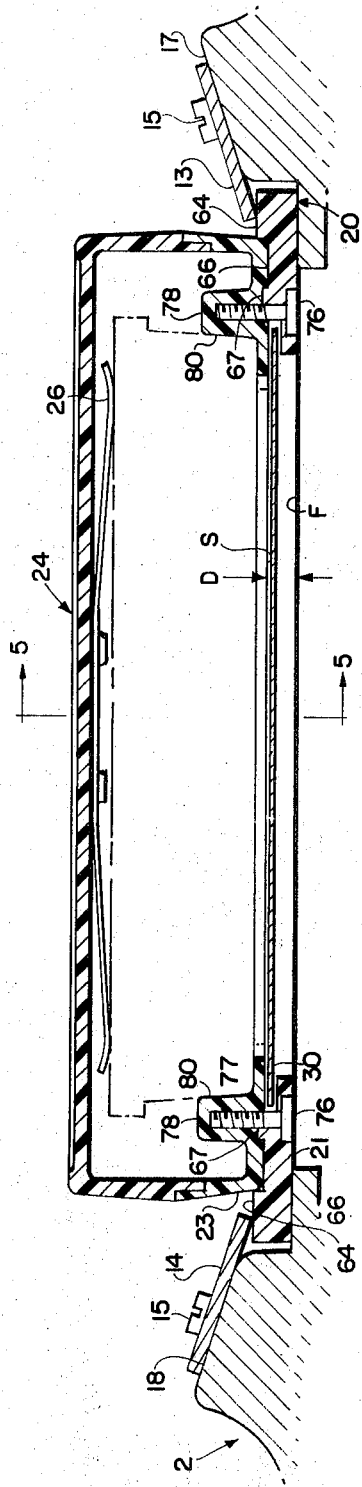
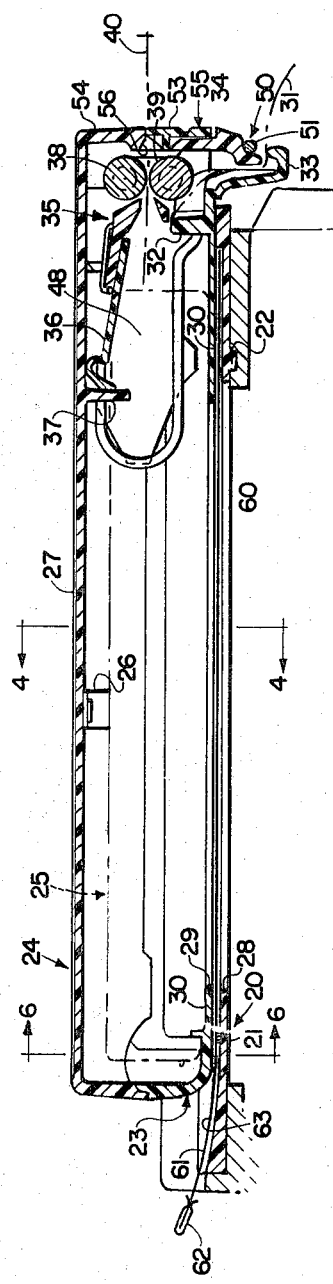

FILM PACK ADAPTER

BACKGROUND OF THE INVENTION

This invention relates to photography, and particularly to a novel cassette holder adaptable to cameras of different designs.

Particularly for use in industrial, studio, scientific and engineering photography, it is desirable to have flexibility, both in the choice of camera type, and in the selection of photosensitive material for use therewith. Traditional camera types such as the press camera, view camera, single lens reflex, twin lens reflex and the like, are generally manufactured to most conveniently accept a particular film format, such as cut film, film packs, roll film or the like, with which conventional negatives are produced.

For many purposes, it would be highly desirable to use such cameras to produce pictures immediately after exposure, with the aid of self-processing materials such as Polaroid Land series 80 and 100 films, for example, with which a finished print can be produced within a minute after the exposure is made. Such photosensitive materials are widely available in standard film packs. However, because it is necessary to associate processing rollers and suitable shields for the tabs and leaders of these film packs with each film pack before the film units in the film pack can be properly exposed and processed, these film packs cannot be directly employed in cameras designed for use with conventional negative materials. There is a large enough demand for self-processing film for use in certain cameras that specialized accessory backs have been developed that are directly usable with the camera. For example, a Polaroid Land camera back is made which is directly connectable to cameras having backs such as the Graflok back on the Speed Graphic camera. A great many other standard camera configurations are less frequently, or only occasionally, used with Polaroid Land film, largely because there is no easy way to adapt the camera for use with the film. And for any particular one of the hundreds of cameras available, the demand would not justify the design and manufacture of a special adapter back. The object of this invention is to simplify the adaptation of cameras of various designs for use with self-processing films.

Briefly, the above and other objects of the invention are attained by a novel film pack holder construction which is provided with processing rollers and adapted to receive a standard pack of Polaroid Land film. One side of the holder is faced off to provide a plane surface parallel to the plane of the outermost film unit in a film pack received in the holder. This plane surface is formed with a framing aperture, and provided with a peripheral groove about the framing aperture.

The plane surface is located closer to the film surface than the minimum distance generally specified between film surface and camera back structure by an amount sufficient to accommodate a fairly substantial adapter plate between the film pack holder and the camera to which the plate will be attached. The plane face of the holder is drilled at a number of locations to facilitate attachment to an adapter plate.

For any particular camera, a finished adapter can be produced by simply making a rectangular plate, formed with an aperture registering with the framing aperture in the film pack holder, and having one face formed with a simple rib structure cooperating with the plane face of the holder to form a light sealed recess adapted to receive a dark slide. The other face of the adapter plate may be formed in any conventional manner to complement the back structure of the particular camera with which it is adapted to cooperate. In this manner, most of the complexity and precision required of the structure for exposing and processing self-processing film is incorporated in the film pack holder. The adapter plate, required to adapt the holder to a particular camera, becomes a relatively simple component without much more complexity than a standard universal lensboard. In accordance with a particular embodiment of the invention, a plate is provided which converts the film pack holder for direct attachment to a Speed Graphic camera having a Graflok back, or other cameras having a similar back construction.

The manner in which the apparatus of the invention is constructed, and its mode of operation, will best be understood in the light of the following detailed description, together with the accompanying drawings, of a preferred embodiment of the invention.

In the drawings,

FIG. 4 is a schematic cross-sectional elevational view of the apparatus of FIG. 1, showing the completed adapter in position on the camera of FIG. 1, with the adapter being shown substantially along the lines 4—4 of FIG. 5;

FIG. 5 is a schematic cross-sectional view of the adapter of FIG. 1, taken essentially along the lines 5—5 in FIG. 4; and FIG. 6 is a fragmentary schematic cross-sectional view of a detail of the adapter of FIGS. 3-5, taken essentially along the lines 6—6 in FIG. 5, showing the construction of the hinge between the front and back of the film pack holder of the invention.

Figure 1:
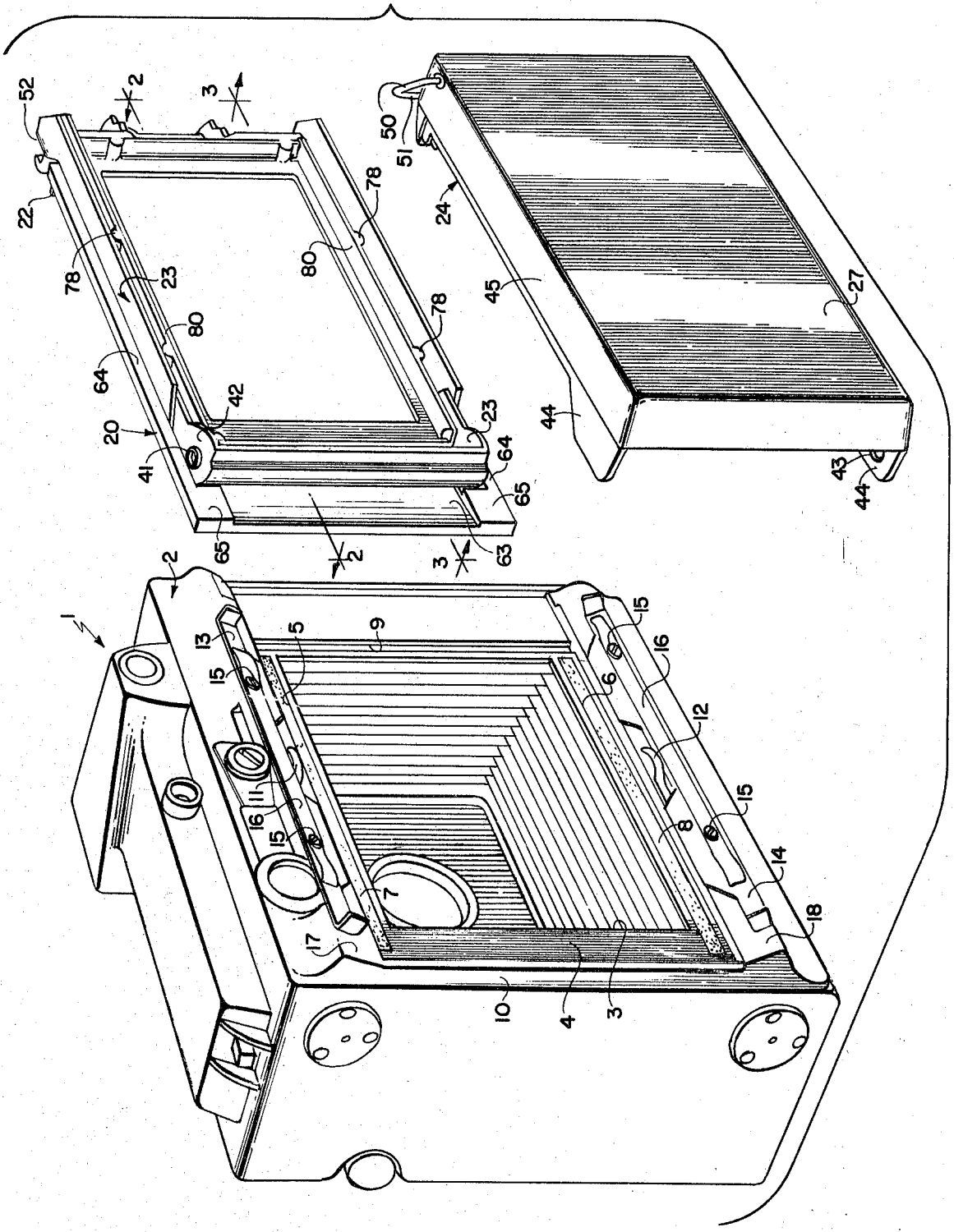
FIG. 1 is an exploded perspective sketch of the Speed Graphic camera and an adapter therefor comprising an adapter plate and a film pack holder in accordance with the invention.

Referring to FIG. 1, there is rather diagrammatically shown the rear of a press camera such as the conventional Speed Graphic, generally designated 1, and provided with the conventional Graflok back generally designated 2. The back 2 is formed with a framing aperture 3 that is surrounded by a plane peripheral face 4.

In the face 4 are formed two parallel grooves 5 and 6, at the top and bottom of the camera, into which felt strips 7 and 8 are mounted to serve as light traps. A vertical slot 9 is formed in the face 4 to accept the locating rib of a conventional cut film holder or film pack adapter. A rib 10 is formed along the left side of the camera, standing above the face 4 to provide a light seal.

The back of the camera is provided with a pair of hooks 11 and 12, serving to accept the tension springs of a conventional spring back including a ground glass and a focusing hood. These hooks are not used with the adapter of the invention.

A pair of slides 13 and 14 are suitably formed with guide slots, not shown, and guided by pins formed on screws 15 that extend through tension plates 16. The screws 15 are fastened into an upper inclined rib 17 and a lower inclined rib 18 formed on the back 2.

The slides 13 and 14 are moveable from the positions shown in FIG. 1 to the positions shown in FIG. 4, in which they are adapted to grasp a flange formed on a Graflex-type film holder or film pack adapter in the conventional manner well known in the art. It is these slides which are employed to engage and hold the adapter of the invention.

Figure 2:
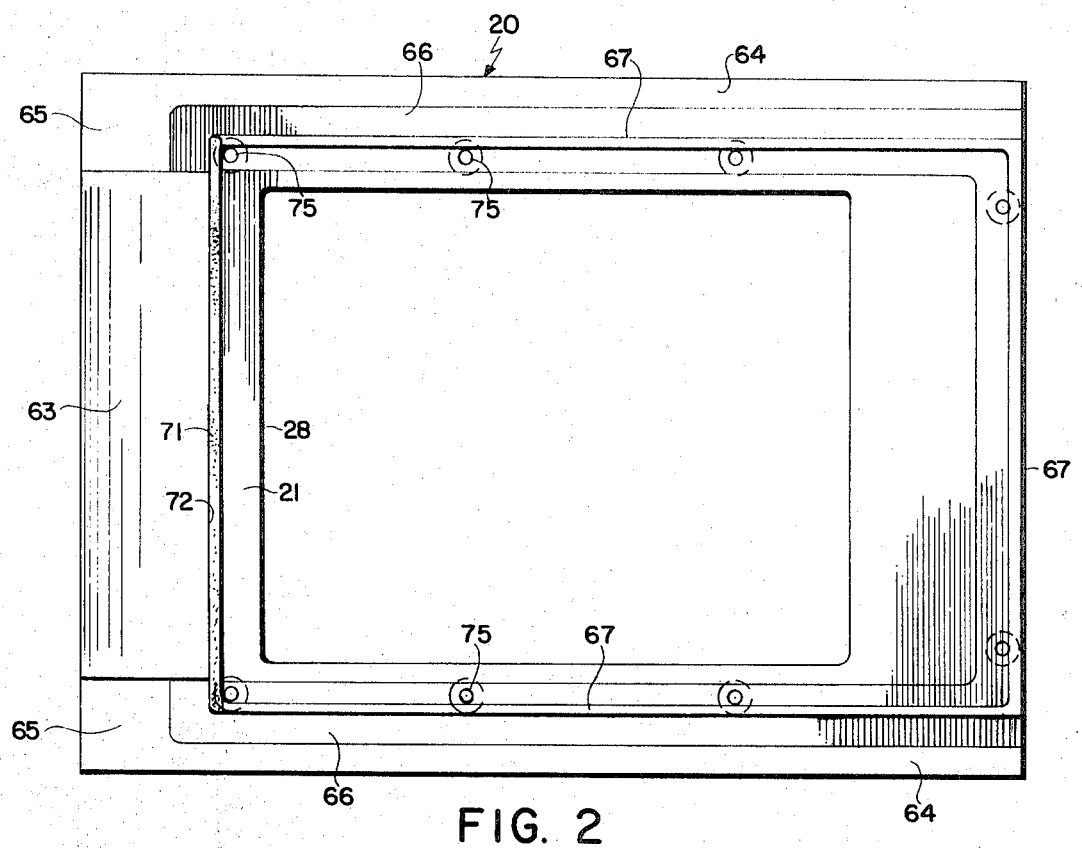
FIG. 2 is a schematic plan view of the adapter plate of FIG. 1, taken essentially along the lines 2—2 in FIG. 1.

Referring to FIGS. 1, 2 and 4, the adapter of the invention comprises an adapter plate generally designated 20 formed with a surface 21 adapted to engage the face 4 of the camera 1. The adapter plate 20 is provided with an outstanding rib 22 adapted to extend into the slot 9 in the camera back 2 to locate the adapter plate 20 relative to the framing aperture 3 in the camera 1.

The adapter plate 20 is connected to a forward housing portion generally designated 23 of the film pack holder of the invention. The forward housing portion 23 of the film pack holder is connected to a rear housing portion 24 by a hinge and bail, to be described in more detail below.

Referring to FIG. 5, the film pack holder comprising the forward and rear housing portions 23 and 24 is adapted to receive a standard Polaroid Land film pack indicated in dotted lines at 25. A spring 26, secured to the back panel 27 of the rear housing 24, urges a framing aperture formed in the cassette 25 into registry with a rectangular framing aperture 28 formed in the adapter plate 20, and a corresponding framing aperture 29 formed in the inner face plate 30 of the inner housing portion 23 of the film pack holder.

The leader 31, extending from the film pack 25, passes over a rib 32 formed integrally with the front wall 30 of the forward housing 23. The leader 31 extends downwardly from the rib 32 through a slot between a downwardly depending lip portion 33, formed integrally with the inner housing 23, and a cooperating downwardly extended lip portion 34, formed integrally with the outer housing 24.

A conventional processing roll assembly generally designated 35 is detachably mounted in the outer housing portion 24, where it is held in position by a spring 36 engaging a rib 37, connected to or formed integrally with the back panel 27 of the outer housing 24. A pair of processing rolls 38 and 39 are journalled on side plates 48 forming a part of the assembly 35 for rotation about parallel axes normal to the plane of FIG. 5. The processing roll assembly may be identical with that incorporated in the Polaroid Land Square Shooter camera, manufactured and sold by the Polaroid Corporation of Cambridge, Massachusetts, for example.

Tabs 40 protrude from the film pack 25 and extend through and between the processing rolls 38 and 39. The tabs serve in the conventional manner to pull an exposed film unit out through the processing rollers and distribute processing fluid throughout the film unit.

The rear housing portion 24 is hinged to the forward housing portion 23 by means of annular cylindrical bosses such as 41 formed integrally with ears 42 on the forward housing portion 23, as best shown in FIGS. 1 and 6. Preferably, the housing parts are formed of plastic or the like which is sufficiently flexible that the bosses 41 can be snap-fitted into cylindrical recesses 43 formed in ears 44. The ears 44 depend from the side walls 45 of the rear housng 24, as shown in FIG. 1, and cooperate with the cylindrical bosses 42 to form a hinge in the manner best shown in FIG. 6.

A bail 50 is pivotally mounted in the outer housing 27, as suggested in FIG. 1, and has a crosspiece 51 that comes down over ledges 52 formed integrally with the forward housing portion 23 to detachably secure the rear housing to the forward housing and thus contain the film pack 25. A light-sealing door 53 is hinged to the end wall 54 of the rear housing 24, as by plastic hinges of polyethylene or the like, as suggested at 55. The door 53 serves to resiliently engage the tabs 40 as they emerge through a slot 56 formed in the end wall 54 of the outer housing 24, to inhibit the entry of light into the film pack holder.

As indicated in FIG. 5, a slot 60 is formed between the adapter plate 20 and the forward housing 23 that serves to admit a conventional dark slide 61. The dark slide 61 may be formed with an enlarged end 62, to facilitate insertion and removal of the slide in a conventional manner, as best shown in FIGS. 1 and 5. Admission of the dark slide is facilitated by the provision of a sloping ledge 63 formed on the outer side of the adapter plate 20.

Figure 3:
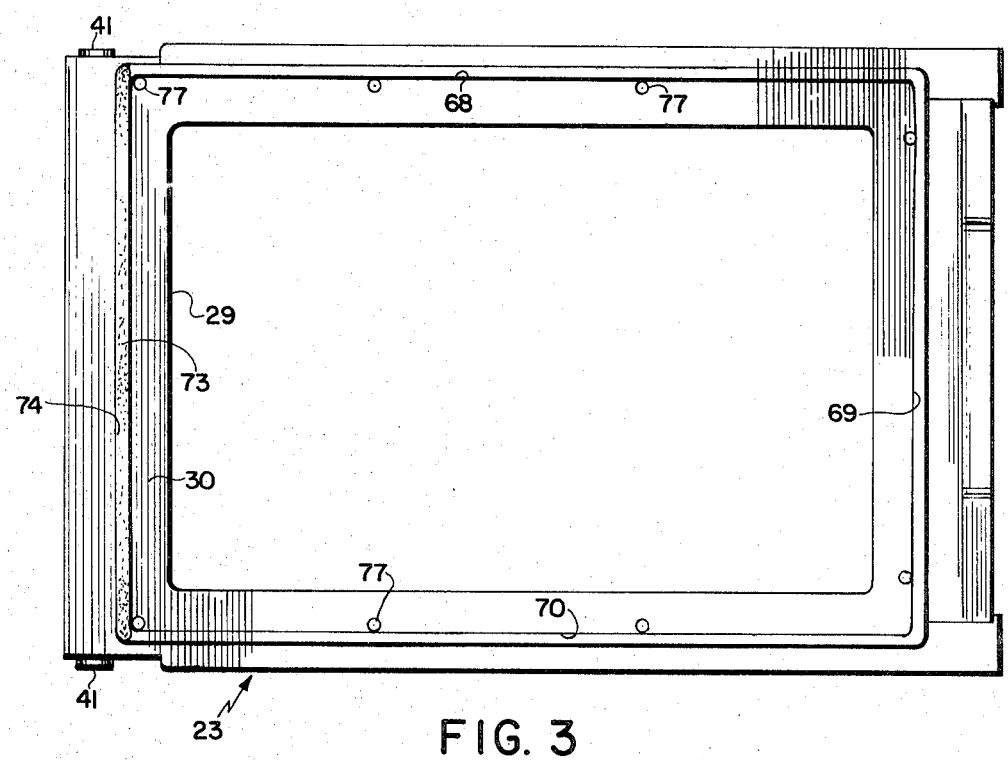
FIG. 3 is a schematic plan view of a front housing forming a part of the film pack holder of FIG. 1, taken essentially along the lines 3—3 in FIG. 1.

Referring to FIGS. 2 and 3, the adapter plate 20 and the forward housing 23 are formed with complementary surfaces which serve to provide the dark slide pocket just described, and to enable the parts to be secured together, and to the camera, in a lighttight fashion. Specifically, the adapter plate 20 is formed with edge portions 64 adapted to be engaged by the slides 13 and 14 in the manner best shown in FIG. 4. The ends of these edges 64 are formed as portions 65 which extend toward each other, as shown in FIGS. 1 and 2, and form the ends of the sloping ledge portion 63 to guide the dark slide 61 into position.

Adjacent the edges 64, the adapter plate 20 is recessed to form L-shaped wells 66 that receive the sides and corners of the inner housing 23. A U-shaped rib 67 abuts these wells 66, as shown in FIG. 2, and extends around three sides of the aperture plate, being adapted to fit into the portions 68, 69 and 70 of a cooperating rectangular groove formed in the periphery of the front plate 30 of the forward cassette housing 23 as shown in FIG. 3.

A slot 71, molded across the front of the aperture plate 20 as indicated in FIG. 2, is adapted to receive a strip of felt 72 which serves to provide a light seal with the dark slide 61 when the apparatus is assembled and the dark slide is inserted. A corresponding seal on the other side of the dark slide is provided by a strip of felt 73 inserted in the corresponding recess 74 formed in the front plate 30 of the forward housing 23, as shown in FIG. 3.

The aperture plate 20 is formed with eight holes such as 75 to admit fasteners, such as the screws 76 shown in FIG. 4, wherewith the adapter plate 20 can be secured to the forward housing 23. Corresponding holes such as 76 are formed in the front plate 30 of the inner housing 23.

As best shown in FIGs. 1 and 4, the holes such as 77 extend into bosses such as 78 formed integrally with an inner locating wall portion 80 extending from the front plate 30 of the inner housing 23. These walls 80 serve to locate the sides of a film pack 25 in the housing.

Referring to FIG. 4, the thickness of the front plate 30 of the inner housing 23 is selected so that when cassette 25 is in position in the cassette housing, the photosensitive surface S of the outermost film unit is located at a distance D specified by the camera manufacturer from the focal plane F of the camera. The thickness of the plate 30 is preferably less than this minimum specified distance by approximately 0.040 inches, so that a relatively substantial aperture plate can usually be provided even though there may be fairly substantial variations in this dimension from camera to camera.

In practice, the adapter plate 20, when secured to the housing comprising the portions 23 and 24, can be installed or removed from the camera with the dark slide in place and exchanged for other accessory adapters. Alternatively, the assembled adapter can be permanently installed on the camera back if it is desired to use only one type of photosensitive material with the camera. For use with the Speed Graphic camera, the framing apertures in the film pack adapter ar necessarily off center with respect to the framing aperture in the camera, but are within that aperture. A suitable mask is provided for the viewfinder to ensure proper framing.

It will be apparent that the specific embodiment of the invention just described forms a simple and convenient adapter for using Polaroid Land film with the Speed Graphic camera, or other press or view cameras having similar backs. It will further appear, however, that all that is necessary to adapt the cassette holder of the invention for use with cameras of other designs is to modify the camera engaging face of the adapter plate 20 for engagement with the back of the selected camera.

While the invention has been described with respect to the details of a preferred embodiment, many changes and variations will occur to those skilled in the art upon reading this description. Such can obviously be made without departing from the scope of the invention.

Having thus described the invention, what is claimed is:

1. A front housing for a film pack holder comprising a plane front wall formed with a rectangular framing aperture, a rectangular groove formed in said front wall on a first side of said front wall and surrounding said framing aperture, a series of bosses formed on a second side of said front wall opposite said first side and surrounding said framing aperture within the confines of said rectangular groove, and means forming fastener receiving apertures extending through said front wall and into each of said bosses, said fastener receiving apertures being located between said groove and said framing aperture in an array extending about three sides of said framing aperture.

2. A photographic adapter plate, comprising a generally rectangular sheet of opaque material having an outstanding ridge on a first side adapted to engage a camera back, a rectangular framing aperture formed in said sheet to admit light therethrough, a generally U-shaped ridge formed on a second side of said sheet opposite said first side and surrounding said aperture on three sides to form a light shield with cooperating external structure, means forming a plane surface between said ridge and said aperture on said second side to guide and support a dark slide, a groove formed in said sheet on said second side between the ends of said U-shaped ridge at one end of said plane surface, and means forming a sloping ledge on said second side adjacent said groove for guiding a dark slide over said groove into sliding engagement with said plane surface.

3. A film pack holder for self-processing film, comprising a forward housing having a front wall formed with a rectangular framing aperture, a rectangular groove formed in said front wall on a first side of said front wall and surrounding said framing aperture, a rear housing, means hinging said forward housing to said rear housing for movement between an open position in which a film pack can be inserted in and removed from said housings and a closed position in which a film pack can be enclosed by said housings but exposed through said aperture, a pair of processing rolls, mounting means mounting said rolls for rotation about adjacent parallel axes, means for detachably securing said mounting means and said rolls in one of said housings, a series of bosses formed on and extending from said front wall on a side of said front wall opposite said first side, said bosses being located in an array extending about three sides of said framing aperture, and means forming a series of holes through said front wall and extending into said bosses, said holes being located in an array within the confines of said groove and spaced from said framing aperture.

4. A film pack adapter for self-processing films, comprising an adapter plate having a first side adapted to engage a camera back and a second side opposite said first side, means forming a first generally rectangular framing aperture in said adapter plate, means forming a generally U-shaped ridge about three sides of said first framing aperture on said second side, a groove formed in said adapter plate across the ends of said ridge on said second side, a film pack holder comprising a forward housing, a rear housing, means hinging said forward housing to said rear housing, said forward housing comprising a front wall, means forming a generally rectangular second framing aperture in said front wall, a rectangular groove formed in said front wall surrounding said second framing aperture and receiving said U-shaped ridge, a pair of processing rolls, and means mounting said processing rolls in one of said housings for rotation about adjacent parallel axes.

5. A film pack holder for use in adapting a camera to accept self-processing film, comprising a forward housing, a rear housing, means hinging said forward housing to said rear housing to form a container than can be opened to admit a film pack and closed to enclose the film pack, said forward housing comprising a front wall panel faced off to form a plane mounting surface, means forming a framing aperture in said front wall panel, means forming a groove in said front wall surrounding said framing aperture, a series of bosses formed on a side of said front wall inside of said forward housing, means forming apertures through said wall into said bosses to receive fastening screws for securing said holder to cooperating structure, said apertures being located between said groove and said framing aperture and being spaced from said framing aperture by a distance sufficient to admit light sealing edge portions of a dark slide overlying said framing aperture with clearance, a pair of processing rolls, and means in one of said housings for mounting said processing rolls for rotation about substantially parallel adjacent axes.

6. The apparatus of claim 5, further comprising wall means formed integral with said front wall and said bosses and forming a receiving chamber for a film pack serving to guide the film pack into registry with said framing aperture, and further comprising an elongated strip of resilient light sealing material received in one side of said groove.

7. A film pack adapter for self-processing films, comprising an adapter plate having a first side adapted to engage a camera back and a second side opposite said first side, means forming a first generally rectangular framing aperture in said adapter plate, means forming a generally U-shaped ridge about three sides of said first framing aperture on said second side, a groove formed in said adapter plate across the ends of said ridge, a first strip of resilient light sealing material in said groove, a film pack holder comprising a forward housing, a rear housing, means hinging said forward housing to said rear housing, said forward housing comprising a front wall formed with a second generally rectangular framing aperture confronting said first aperture, a rectangular groove formed in said front wall surrounding said second framing aperture and receiving said U-shaped ridge, a second strip of resilient light sealing material in a side of said groove confronting said first strip, a dark slide slidably mounted between said adapter plate and said forward housing and extending between said strips, inside of said rectangular groove and covering said second framing aperture, a pair of processing rolls, and means journalling said processing rolls in one of said housings for rotation about adjacent parallel axes.

8. The apparatus of claim 7, further comprising a series of bosses extending from said front wall on a side opposite said groove, and means forming a series of apertures through said front wall within the confines of said groove and extending into said bosses.

9. The apparatus of claim 7, further comprising means forming a first exit slot between said housings, said housings being movable about said hinging means between an open position and a closed positon and said slot being formed between said housings along a line parallel to the axes of said rolls in said closed position of said housings, and means forming a second slot in one of said housings extending along a line parallel to said axes.

* * * * *